US008396011B2

(12) United States Patent
Carolan et al.

(10) Patent No.: US 8,396,011 B2
(45) Date of Patent: **\*Mar. 12, 2013**

(54) METHOD AND APPARATUS FOR COORDINATING A CHANGE IN SERVICE PROVIDER BETWEEN A CLIENT AND A SERVER WITH IDENTITY BASED SERVICE ACCESS MANAGEMENT

(75) Inventors: Sean E. Carolan, Jackson, NJ (US); John W. Garrett, Neshanic Station, NJ (US); Charles Robert Kalmanek, Jr., Short Hills, NJ (US); Han Q. Nguyen, Marlboro, NJ (US); Kadangode K. Ramakrishnan, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 204 days.

This patent is subject to a terminal disclaimer.

(21) Appl. No.: 12/857,061

(22) Filed: Aug. 16, 2010

(65) Prior Publication Data
US 2010/0313251 A1    Dec. 9, 2010

Related U.S. Application Data

(63) Continuation of application No. 11/321,152, filed on Dec. 29, 2005, now Pat. No. 7,801,056, which is a continuation of application No. 09/812,314, filed on Mar. 20, 2001, now Pat. No. 7,027,432.

(60) Provisional application No. 60/190,633, filed on Mar. 20, 2000.

(51) Int. Cl.
*H04L 12/28* (2006.01)
*H04L 12/56* (2006.01)

(52) U.S. Cl. .......... 370/254; 370/401; 709/250
(58) Field of Classification Search .......... 370/254, 370/401; 709/203–227, 250
See application file for complete search history.

(56) References Cited

U.S. PATENT DOCUMENTS

| 6,212,192 | B1 * | 4/2001 | Mirashrafi et al. | 370/401 |
|---|---|---|---|---|
| 6,360,246 | B1 * | 3/2002 | Begley et al. | 709/203 |
| 6,823,389 | B1 * | 11/2004 | Satomi et al. | 709/227 |
| 6,842,789 | B1 * | 1/2005 | Nazari | 709/245 |
| 6,957,260 | B1 * | 10/2005 | Mighdoll et al. | 709/225 |
| 2002/0002621 | A1 * | 1/2002 | Zhang et al. | 709/238 |

* cited by examiner

*Primary Examiner* — Hassan Kizou
*Assistant Examiner* — Emmanuel Maglo (57) ABSTRACT

A method of configuring a network access device connected to an access network connected to a plurality of service networks, the network device having a first network address allocated to a subscriber of services of a first service provider provided by a first service network, with a new network address allocated to a second subscriber of services of either the first service provider, or a second service provider provided by a second service network. The method comprises the steps of: sending a request from the network access device to the access network with user credentials for the second subscriber requesting access to the first service provider or a change to the second service provider; receiving a response from the access network; and initiating a network address change request using a configuration protocol. In this manner, a second network address allocated to the second subscriber of services of either the first or second service providers is assigned to the network access device to enable the network access device to communicate data packets to the service network providing the selected service.

12 Claims, 8 Drawing Sheets

METHOD AND APPARATUS FOR COORDINATING A CHANGE IN SERVICE PROVIDER BETWEEN A CLIENT AND A SERVER WITH IDENTITY BASED SERVICE ACCESS MANAGEMENT

CROSS-REFERENCE TO RELATED APPLICATIONS

This application claims priority, under 35 U.S.C. §120 to U.S. patent application Ser. No. 11/321,152 entitled "METHOD AND APPARATUS FOR COORDINATING A CHANGE IN SERVICE PROVIDER BETWEEN A CLIENT AND A SERVER WITH IDENTITY BASED SERVICE ACCESS MANAGEMENT" filed in the name of Carolan et al. on Dec. 29, 2005, now allowed and assigned to the Assignee of the present application, which claims priority under 35 U.S.C. §120 to U.S. Pat. No. 7,027,432, filed Mar. 20, 2001, which claims priority under 35 U.S.C. §119 to U.S. Provisional Application Ser. No. 60/190,663 entitled "Internet Service Selection Over Cable," filed on Mar. 20, 2000, the content of each are incorporated by reference herein.

FIELD OF THE INVENTION

The present disclosure relates generally to communication network services, and, more particularly, to a method for enabling a client to change between service providers in a broadband communications network.

BACKGROUND OF THE INVENTION

Customers of communication network services often desire access to a plurality of different services and different service providers. For example, when using a dial-up connection to a packet-switched data network such as the Internet, a customer can choose from multiple service providers by dialing different telephone numbers in the PSTN. The physical path from the customer to the customer's Internet Service Provider (ISP) is dedicated to the connection for the duration of the telephone call. The ISP assigns an IP address to the customer and can link the authenticated customer and the assigned IP address to the physical address (e.g. dial-up modem) used by the customer. With this linkage, the ISP can ensure the customer only uses the address authorized by the ISP and can use the customer's IP address to manage access to the ISP's services. Both the physical connection between a customer and the ISP, and the linkage to IP address assignment and customer authentication are terminated when the dial-up connection is terminated.

Constrained by the physical capacity of these temporary connections across the PSTN, many service providers are moving to high-speed access architectures (e.g., digital subscriber line (DSL), wireless, satellite, or cable) that provide dedicated physical connectivity directly to the subscriber and under the control of the ISP. These alternatives to shared access through the switched telephone network, however, do not lend themselves to shared access by multiple services and/or service providers, and/or shared access by multiple subscribers.

SUMMARY OF THE INVENTION

The present disclosure provides in an illustrative embodiment, a method of configuring a network access device connected to an access network connected to a plurality of service networks, the network device having a first network address allocated to a subscriber of services of a first service provider provided by a first service network, with a new network address allocated to a second subscriber of services of either the first service provider, or a second service provider provided by a second service network. The method comprises the steps of: sending a request from the network access device to the access network with user credentials for the second subscriber requesting access to the first service provider or a change to the second service provider; receiving a response from the access network; and initiating a network address change request using a configuration protocol. In this manner, a second network address allocated to the second subscriber of services of either the first or second service providers is assigned to the network access device to enable the network access device to communicate data packets to the service network providing the selected service.

In one preferred embodiment, the subscriber is authenticated by a service activation system coupled to the access network prior to initiating the configuration protocol. Accordingly, the request to the access network includes an authentication request for the subscriber. The response received from the access network therefore includes an authentication status for the subscriber from the second service provider. If the subscriber is authenticated, the client initiates the network address change request.

These and other advantages of the invention will be apparent to those of ordinary skill in the art by reference to the following detailed description and the accompanying drawings.

DETAILED DESCRIPTION

Figure 1:
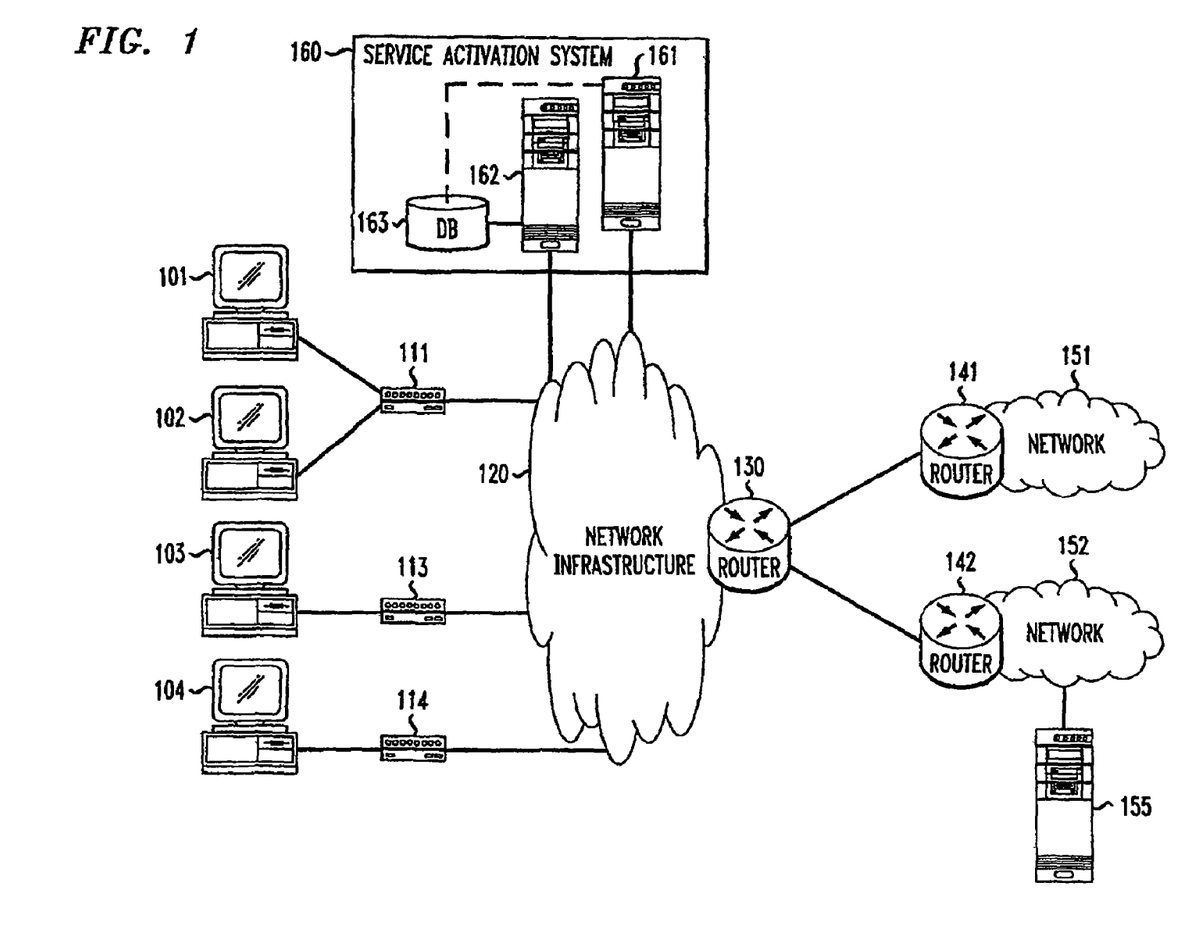
FIG. 1 illustrates an interconnection of packet-switched service networks and an access network embodying principles of the invention.

In FIG. 1, a plurality of subscribers operating network access devices 101, 102, 103, . . . 104 are provided access to communication network services, which are facilitated by a plurality of packet-switched data networks, shown in FIGS. 1 as 151 and 152. Packet-switched data networks 151 and 152, referred to herein as "service networks," offer access to different services and/or are operated by different service providers. For example, service network 151 could provide packet-switched connectivity to public data networks while service network 152 could offer packet-switched telephony service (or the same public data network connectivity, but from a different service provider). The service networks, as is well known in the art, utilize a network addressing scheme to route datagrams to and from hosts: for example, where the service networks utilize the TCP/IP protocol suite, Internet Protocol (IP) addresses are assigned to each host and utilized in the process of routing packets from a source to a destination in the networks. See, e.g., "INTERNET PROTOCOL," IETF Network Working Group, RFC 791 (September 1981); S. Deering, R. Hinden, "Internet Protocol, Version 6 (IPv6) Specification," IETF Network Working Group, RFC 1883 (December 1995), which are incorporated by reference herein. The invention shall be described herein with particular reference to the TCP/IP protocol suite and IP addresses, although those skilled in the art would readily be able to implement the invention using any of a number of different communication protocols.

The network access devices 101 . . . 104 are typically customer premises equipment (CPE) such as a personal computer, information appliance, personal data assistant, data-enabled wireless handset, or any other type of device capable of accessing information through a packet-switched data network. Each network access device 101 . . . 104 is either connected to or integrated with a network access unit 111 . . . 114, e.g. a modem, which enables communication through an access network infrastructure, shown as 120 in FIG. 1. Each network access device is assigned an IP address, which, in accordance with an aspect of the invention, is associated with a particular service or service provider to which the user of the device is subscribed. For example, network access device 101 is assumed to have been assigned, for purposes of the description herein, an IP address associated with a service provider operating service network 151. As further described herein, it is advantageous to provide a service activation system 160 which advantageously permits the dynamic allocation, assignment, and reassignment of IP addresses to the plurality of network access devices based on customer subscriptions to particular services.

The network access device 101 communicates with the service network 151 through the access network infrastructure 120, which, in accordance with aspects of the invention, is capable of recognizing and directing traffic to the proper service network. The access network infrastructure 120 advantageously can be operated and maintained by an entity that is the same as or different from the entities operating and maintaining the service networks 151 and 152. In accordance with an embodiment of an aspect of the present invention, the different IP-based services offered by the different service networks 151 and 152 utilize shared layer one and layer two resources in the access network 120. Layer three routing procedures, however, are modified to permit IP traffic from network access device 101 to flow to the correct subscribed service network 151. The access network 120 has a router 130 on the edge of the access network. The router 130 has a first interface with a connection to a router 141 in service network 151 and a second interface with a connection to a router 142 in service network 152. As further described herein, the router processes packets and is capable of directing traffic to the proper service network.

Figure 2A:
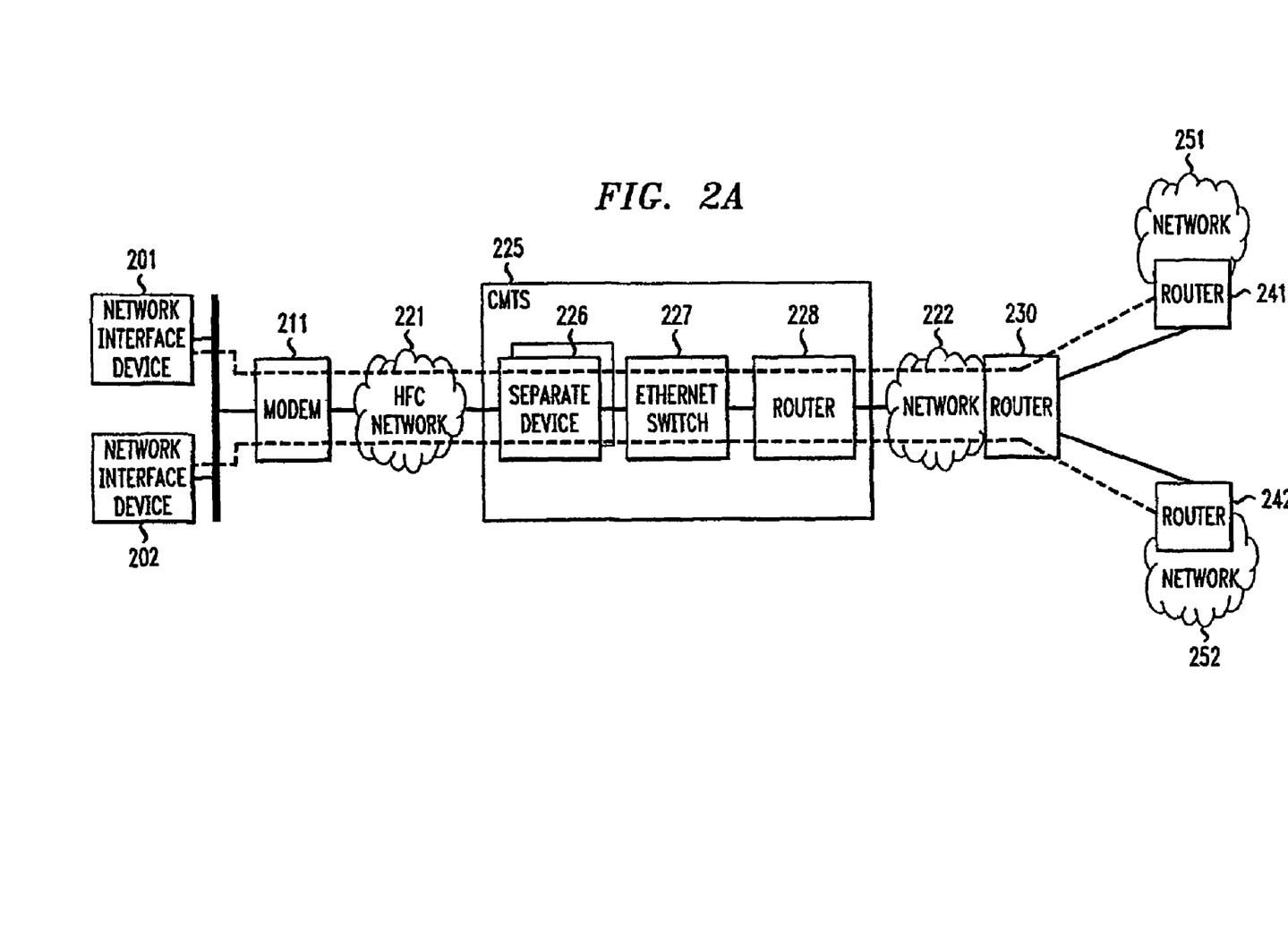
FIG. 2A and FIG. 2B is conceptual representation of an exemplary embodiment illustrating principles of the invention based on an HFC access architecture with corresponding end-to-end protocol layers.
Figure 2B:
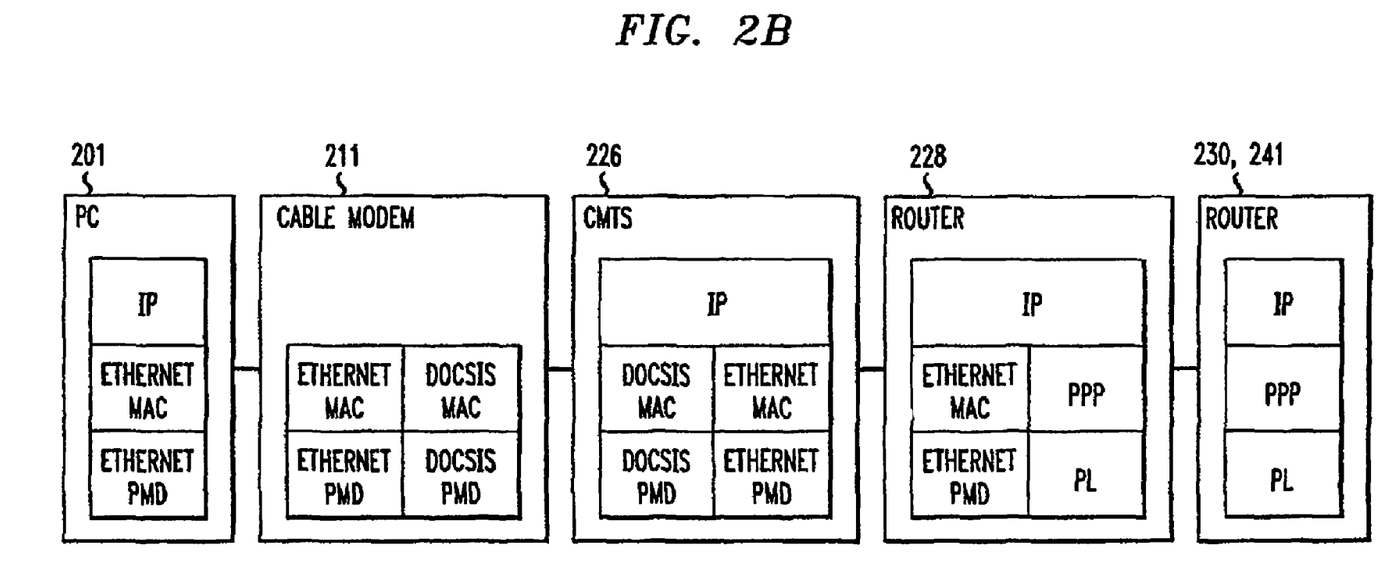

FIG. 2A shows an exemplary access architecture based on a hybrid fiber coaxial (HFC) access network. As is known in the art, each network interface device 201 . . . 202 is either connected to or integrated with a cable modem 211 which enables communication through the HFC network 221. In accordance with the Data Over Cable Service Interface Specification (DOCSIS), a Cable Modem Termination System (CMTS), shown as 225 in FIG. 2A, communicates with the cable modems 211 and manages access to both upstream and downstream cable capacity on the HFC networks 221. See, e.g., "Data-Over-Cable Service Interface Specifications: Cable Modem Termination System—Network Side Interface Specification," Cable Television Laboratories, Inc., SP-CMTS-NSI-I01-960702; "Data-Over-Cable Service Interface Specifications: Cable Modem to Customer Premise Equipment Interface Specification," Cable Television Laboratories, Inc., SP-CMCI-C02C-991015; "Data-Over-Cable Service Interface Specifications Baseline Privacy Plus Interface Specifications," Cable Television Laboratories, Inc., SP-BPI+-I06-001215, which are incorporated by reference herein. The CMTS 225 manages the scheduling of both upstream and downstream transmission and allocates cable capacity to individual customers identified by a Service IDs (SIDs). The CMTS 225 can have an integrated router 228 or can be a separate device 226 that bridges to a fast Ethernet switch 227 which connects to the router 228. The IP router 228 provides connectivity to an IP network 222, which further comprises the router 230 (corresponding to router 130 in FIG. 1) which interfaces to IP routers 241 and 242 in service networks 251 and 252, respectively. Accordingly, the HFC network 221, the CMTS 225, and the IP network 222 correspond to the access network infrastructure 120 shown in FIG. 1. FIG. 2B shows a conceptual diagram of the end-to-end communication protocol stack from a network access device 201 (101) to a router 241 (141) in service provider's network 251 (151). As is known in the art, the lowest layer deals with the physical layer (PL) of the protocol stack, e.g. the Ethernet physical media device (PMD) layer; the second layer deals with the data link layer, e.g. the Ethernet Media Access Control (MAC) layer; which the third layer in the protocol stack deals with the network layer, e.g. the IP layer.

Router 130 in the access network 120 in FIG. 1 (corresponding to IP router 230 in FIG. 2) separates the IP traffic to/from the multiple services or service providers as well as combines traffic from the multiple service or service providers. In accordance with an aspect of the invention, IP packets are routed from network access device 101 to the subscribed service network 151 using source address-based policy routing. Conventional routing is destination-based: the router consults an internal routing table which maps the destination addresses of all inbound packets to a physical interface address for use for outgoing packets. Policy routing schemes, however, will selectively choose different paths for different packets even where the packet's destination address may be the same. Since network access devices are assigned addresses associated with a particular network service provider, the source address based policy routing scheme ensures packets from a network access device will go to the appropriate service network. Generally, the router receives an incoming packet, reads the packet header and retrieves the packet filtering rules, typically stored in an access list. The router then applies the packet filtering rules, and compares the source IP address in the packet header to a list of addresses allocated to subcribers to a first service provider, e.g. operating service network 151 in FIG. 1. If the source address matches one of these addresses, then the router forwards the packet to a router in service network 151, e.g. router 141 in FIG. 1. The router compares the source IP address in the packet header to a list of addresses allocated to subscribers of a second service provider, e.g. operating service network 152 in FIG. 1. If the source IP address matches one of these addresses, then the router forwards the packet to a router in service network 152, e.g. router 142 in FIG. 1. The router continues in this fashion with any other packet filtering rules identifying IP addresses allocated to subscribers of any other service providers. Assuming the IP source address does not match any such addresses associated with a service provider, the router applies any remaining packet filtering rules and routes or denies the packet accordingly.

The network access device (or "client") 101 includes, in an exemplary embodiment as a personal computer, a processing unit, memory, and a bus that interfaces the memory with the processing unit. The computer memory includes conventional read only memory (ROM) and random access memory (RAM). An input/output system (BIOS) contains the basic routines that help to transfer information between elements within the network access device 101 such as, for example, during start up. These are stored in the ROM. The network access device 101 may further include a hard disk drive, a magnetic disk (e.g., floppy disk) drive, and an optical disk drive (e.g., CD-ROM) in a conventional arrangement. The hard disk drive, magnetic disk drive and optical disk drive are coupled to the bus by suitable respective interfaces. The drives and associated computer-readable media provide non-volatile storage for the network access device 101. The network interface unit 111 (211) as depicted in FIGS. 1 and 2 is coupled to an appropriate network interface communicating with the system bus.

Client software residing in the computer memory associated with any particular network access device 101 . . . 104 may provide a user interface for accessing several different communication network services at different times and in different browsing sessions. For example, browser software running on network access device 101 (FIG. 1) may serve as a user interface for accessing both service network 151 and service network 152.

Figure 3:
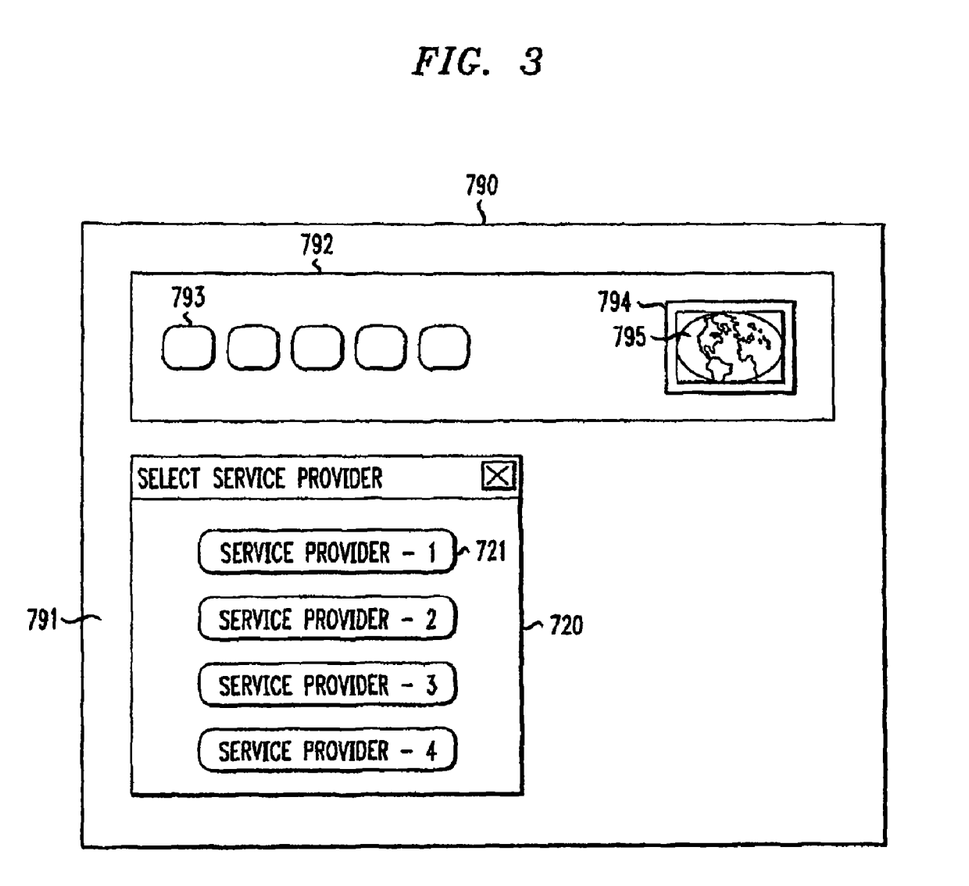
FIG. 3 is a diagram of a browser user interface showing the service provider manager function of the client software.

An illustrative browser user interface 790 generated by software running on the client is depicted in FIG. 3. The browser user interface 790 includes an HTML display area 791, and a windows-type border area including a function bar 792 having a plurality of buttons 793. A branding region 794 is provided in the border area for displaying brand indicia 795 as described copending application entitled "Method and Apparatus for Dynamically Displaying Brand Information In a User Interface," assigned to a common assignee and filed concurrently herewith. The branding region may be located in the border 792 as shown, or may be located elsewhere in the border area of the browser. The brand indicia 795 displayed in the branding region 794 consists of information retrieved by the network access device from a branding data server (not shown).

The browser user interface 790 provides a graphical user interface (GUI) and includes a service provider manager function or module that enables the user to switch between service providers (e.g., associated with networks 151, 152). The service provider manager function is enabled by selecting the appropriate button or control on the menu bar 792. This may be explicitly presented on a particular button 793 or such function can be part of a selection on a drop-down menu. The service provider management function of the client software permits the user to select a service provider from a list of subscribed service providers. In the embodiment depicted in FIG. 3, the service provider manager function has been selected by the user and a window 720 is generated that contains a plurality of choices, e.g., SERVICE PROVIDER-1, SERVICE PROVIDER-2, SERVICE PROVIDER-3, and SERVICE PROVIDER-4 (hereinafter described as svc-1, svc-2, etc). User credentials for each service provider may be cached within the client memory. The service provider manager can also offer to add new service providers in accordance with the user's selection, and update information may be downloaded as is well known in the art. As described herein, a subscriber to svc-1 has an IP address currently allocated to svc-1, and desires to change to svc-2. The process for effectuating this change will be described in more detail below.

It is advantageous to enable the IP addresses—which ultimately determine the service network utilized by the particular network access device—to be allocated and reassigned dynamically. With reference to FIG. 1, a service activation system 160 is shown which further comprises a configuration server 161 and a registration server 162 connected to the access network infrastructure 120. The registration server 162 provides a network-based subscription/authorization process for the various services shared on the access network infrastructure 120. A customer desiring to subscribe to a new service can access and provide registration information to the registration server 162, e.g. by using HTML forms and the Hyper Text Transfer Protocol (HTTP) as is known in the art. Upon successful service subscription, the registration server 162 updates a customer registration database 163 which associates the customer information including the customer's hardware address (e.g., the MAC address of the network access device 101) with the subscribed service.

The configuration server 161 uses the registration information to activate the service. The configuration server 161 is responsible for allocating network addresses on behalf of the service networks from a network address space associated with the selected service. In a preferred embodiment of this aspect of the invention, the configuration server 161 uses a host configuration protocol such as the Dynamic Host Configuration Protocol (DHCP) to configure the network addresses of the network access devices. See R. Droms, "Dynamic Host Configuration Protocol," IETF Network Working Group, RFC 2131 (March 1997); S. Alexander, R. Droms, "DHCP Options and BOOTP Vendor Extensions," IETF Network Working Group, RFC 2132 (March 1997); which are incorporated by reference herein. This aspect of the invention shall be described herein with particular reference to DHCP, and the configuration server 161 shall be referred to herein as the DHCP server, although those skilled in the art would readily be able to implement this aspect of the invention using a different protocol.

Figure 4:
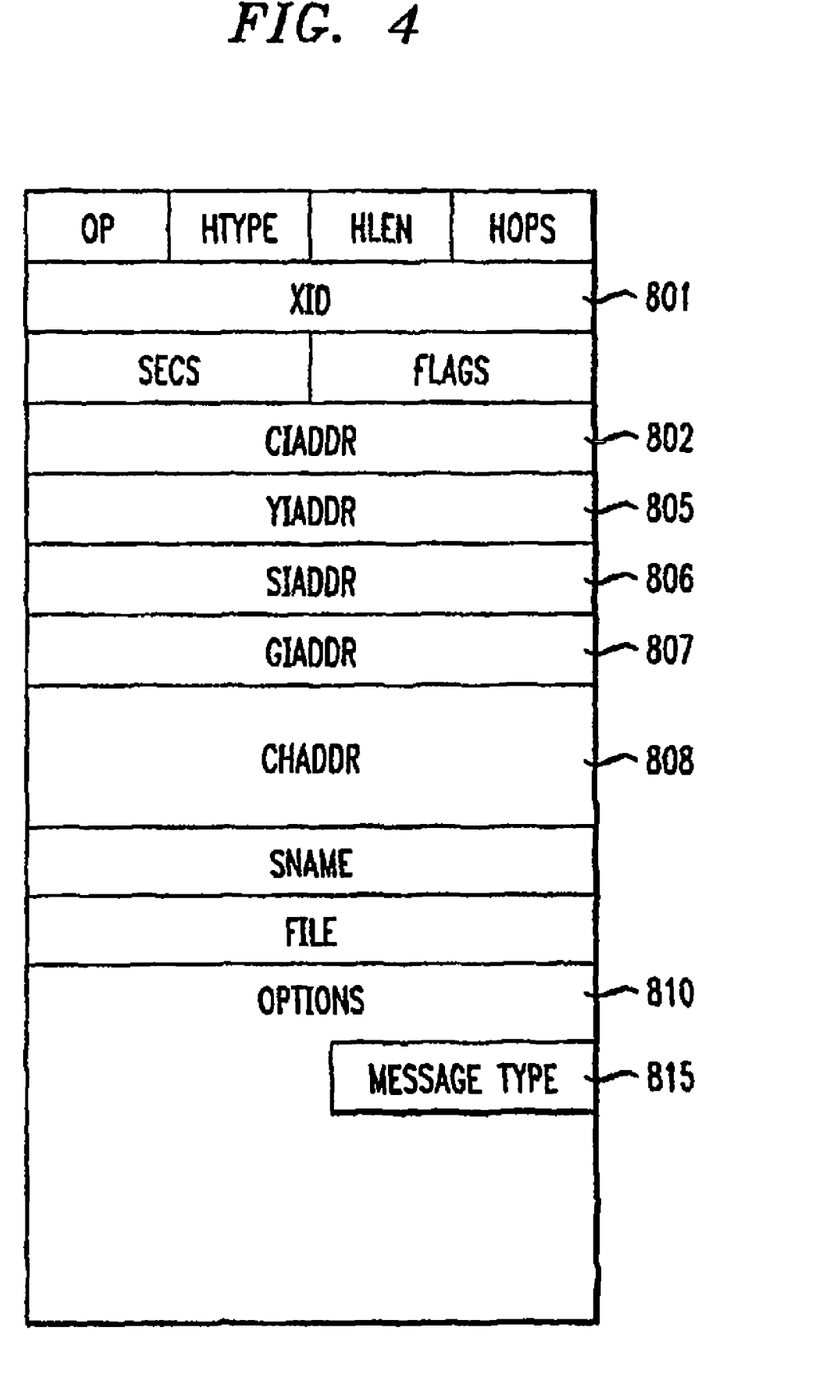
FIG. 4 is a conceptual representation of a DHCP message exchanged between the network access device and a DHCP server.

Referring now to FIG. 4, an exemplary format for a DHCP message is shown generally at 800. The message 800 comprises an xid field 801, ciaddr field 802, yiaddr field 805, siaddr field 806, giaddr field 807, chaddr field 808, and an options field 810 including a message type sub-field 815 and svc-id 820. Each DHCP message is characterized by type, such as DHCPDISCOVER, DHCPOFFER, DHCPREQUEST OR DHCPACK. The type of each DHCP message is encoded into options field 810. Each DHCP message 800 is set to indicate whether it is being communicated from a client 101 or the DHCP server (part of the network administration system) 121. The message identification is implemented by setting the op field to BOOTREQUEST or BOOTREPLY, to respectively indicate the origin of the message. The IP address is contained in the yiaddr field 805. The chadddr field 808 contains the MAC address of the client 101.

Figure 5:
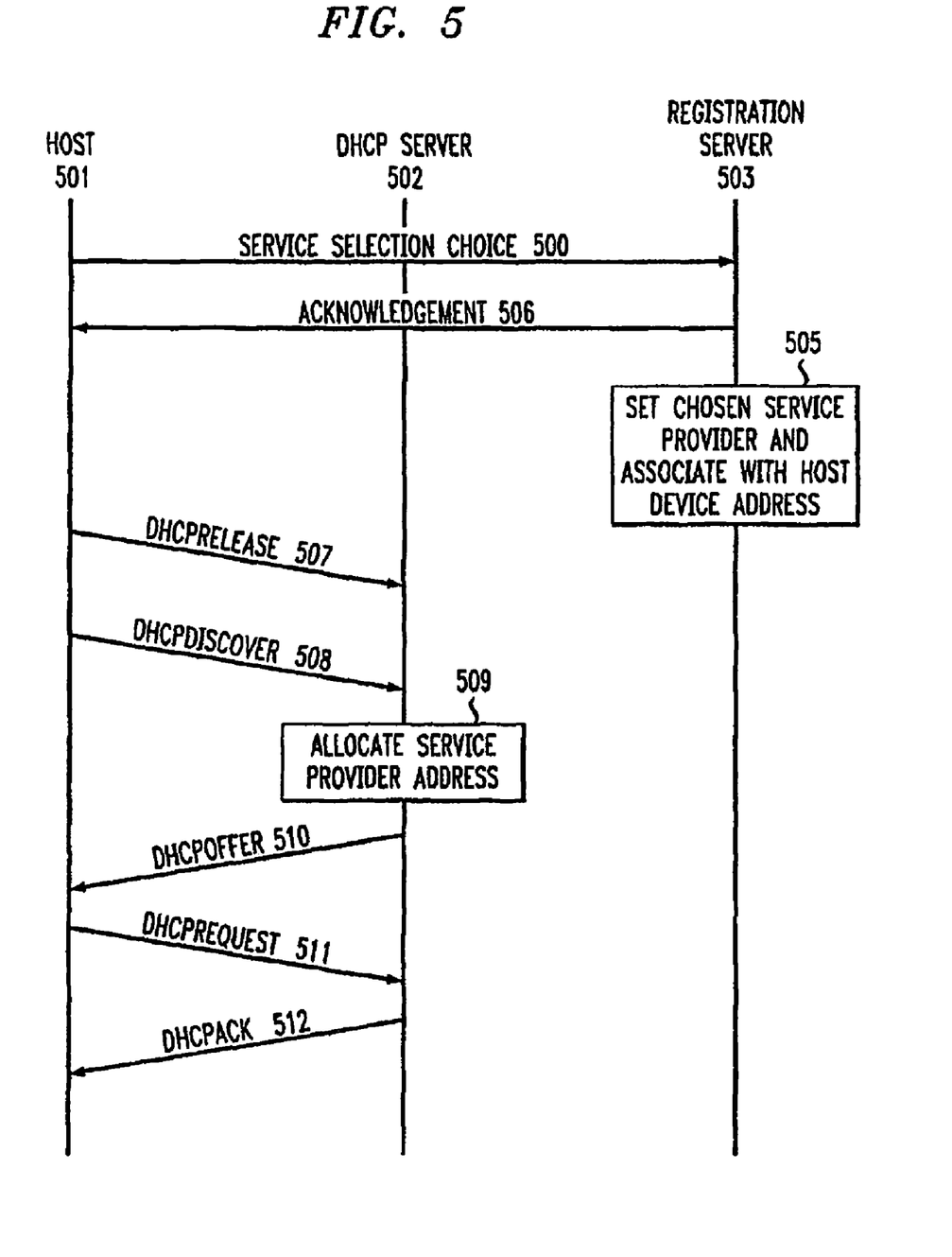
FIG. 5 is a timeline diagram of messages exchanged in the assignment of a network address associated with a particular service to a network access device, in accordance with a preferred embodiment of another aspect of the invention.
Figure 6:
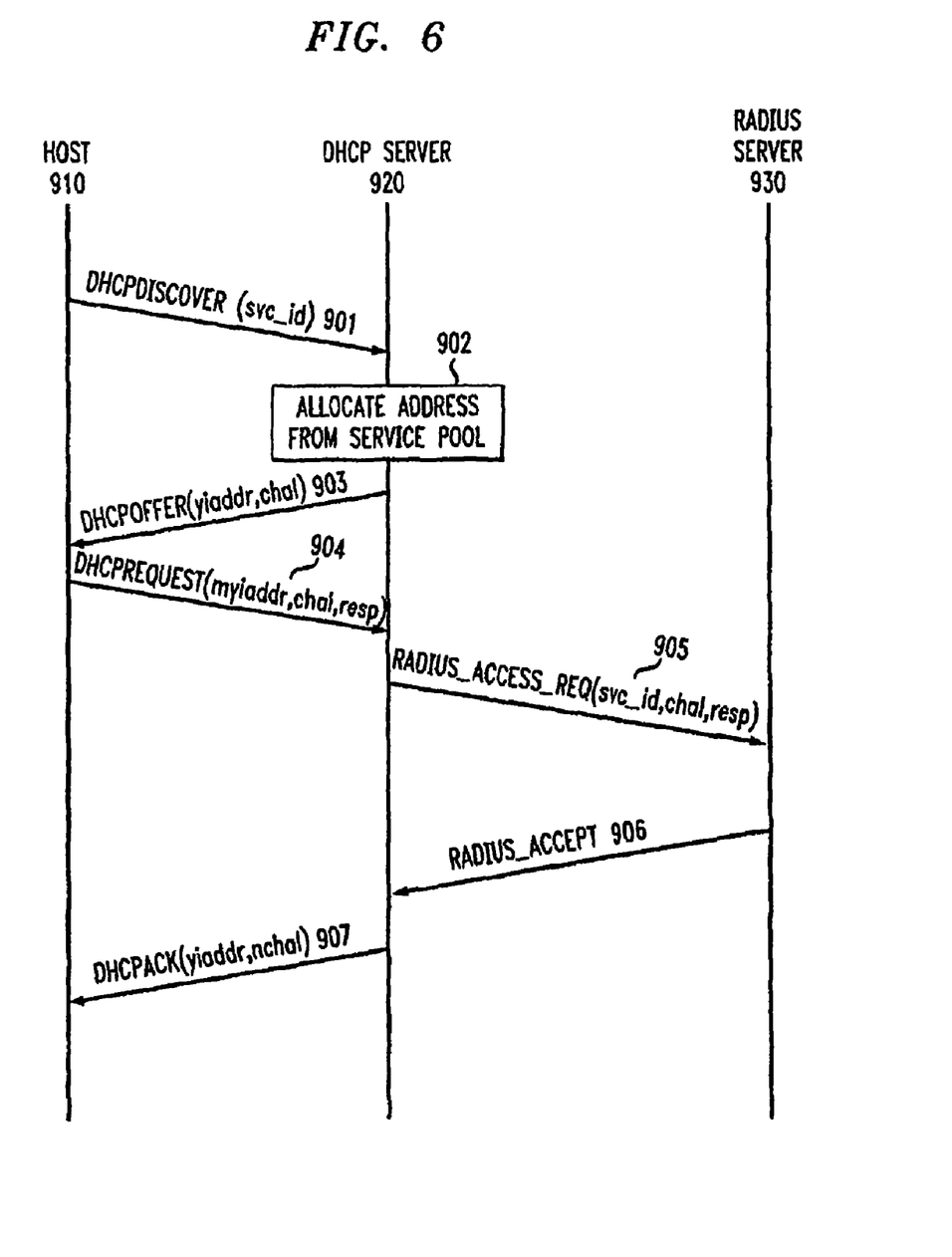
FIG. 6 is timeline diagram of messages exchanged in the assignment of a network address associated with a particular service to a network access device, in accordance with a preferred embodiment of another aspect of the invention.

Referring now to FIG. 5, there is shown an embodiment where the subscriber registers the service selection with the registration server which temporarily establishes the association between the network access device's hardware address (e.g. the MAC address of the device) and the chosen service selection. The configuration server then uses the MAC address of the network access device to assign an IP address from the proper address space. FIG. 5 is a simplified timeline diagram of DHCP messages exchanged, in accordance with such an embodiment. At 500, the network access device 501 registers a service selection with the registration server 503.

The client 501 sends a "SET ISP" message to the registration server 503. It is assumed that the subscriber has passed the proper authentication procedures for the particular service selected, either beforehand (e.g. through transactions directly with the service provider's network) or in the same session with the registration server. In this manner, each user of the client must be individually authenticated for a particular service. This is necessary to prevent anyone from obtaining unauthorized access over the shared access network. At 505 the registration server 503 stores the selected service and associates the service selection with the hardware device address (MAC address) of the network access device 501. It is advantageous for the DHCP server 502 to set a client class to the selected service provider with an "AUTHENTICATE UNTIL" option set to 10 minutes, to avoid assignment of the service-related IP address to another device. The registration server 503 sends an acknowledgment 506 to the network access device 501. After receiving the acknowledgment from the registration server 503, the network access device 501 releases any pre-existing address assignment by issuing a DHCPRELEASE message at 507. At 508, the network access device issues a standard DHCPDISCOVER message. The DHCP server 502 receives the DHCPDISCOVER message and, at 509, allocates an IP address from the pool of address associated with the particular service associated with the device's MAC address. The DHCP server 502 should check to see whether the current client set to ISP "AUTHENTICATE UNTIL" has not expired. At 510, the DHCP server 502 sends a DHCPOFFER message that includes the IP address in a field in the DHCP message. At 511, the network access device 501 receives the DHCPOFFER and sends out a DHCPREQUEST back to the DHCP server 502. At 512, the DHCP server 502 commits to assigning the IP address to the network access device 501, commits the binding to persistent storage, and transmits a DHCPACK message containing the configuration parameters for the device. If the DHCP server is unable to satisfy the DHCP REQUEST message, the server responds with a DHCPNAK message.

It is preferable that the DHCP servers and clients use some mutual authentication mechanism to restrict address assignment to authorized hosts and to prevent clients from accepting addresses from invalid DHCP servers. For example, the "delayed authentication" scheme described in R. Droms, W. Arbaugh, "Authentication for DHCP Messages," IETF Network Working Group, Internet Draft, <draft-ietf-dhc-authentication-_.txt>; or the Kerberos-based authentication mechanism described in K. Hornstein, T. Lemon, B. Aboba, J. Trostle, "DHCP Authentication via Kerberos V," IETF Network Working Group, Internet Draft, <draft-hornstein-dhc-kerbauth-_>; which are incorporated by reference herein. The "delayed authentication" mechanism supports mutual authentication of DHCP clients and servers based on a shared secret, which may be provisioned using out-of-band mechanisms. On the other hand, the Kerberos-based mechanisms are very well suited for inter-realm authentication, thereby supporting client mobility, i.e. a network access device could connect to a particular access network infrastructure without any prior registration with the access network. Each service network provider could securely authenticate the network access device accessing the service network from another network "realm," e.g. the access network infrastructure.

Figure 7:
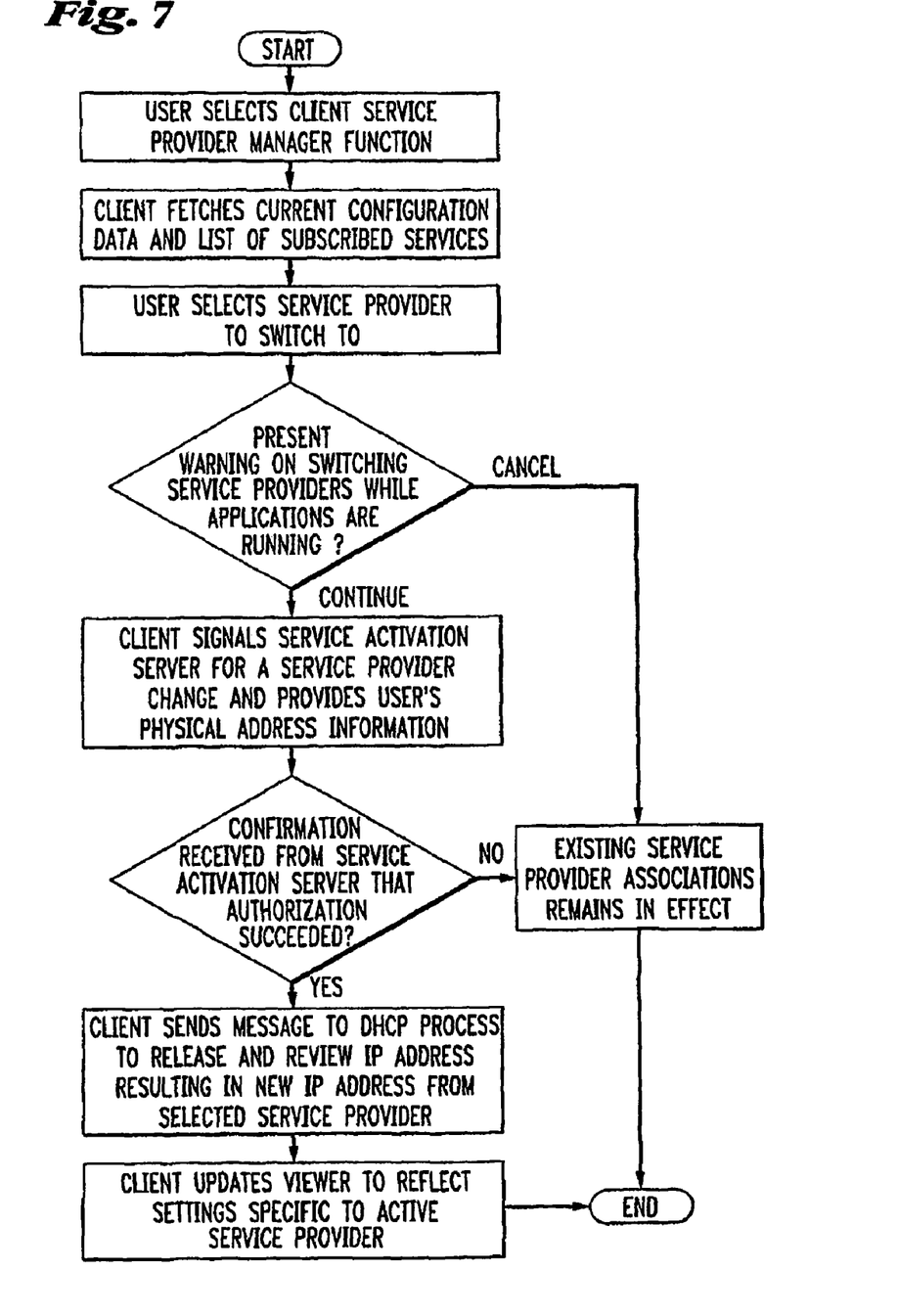
FIG. 7 is a flowchart of the actions of the service client in accordance with an embodiment of the invention.

The operator of the relevant service network, e.g. service network 152 in FIG. 1, may desire to maintain a separate registration server, e.g. server 155 in FIG. 1, and to retain responsibility for user authentication and authorization. The service activation system 160 can provide a proxy server configured to permit HTTP traffic only between local hosts and registration server 155 in service network 152. The service provider operating service network 152 would then be responsible for providing the appropriate registration information required for proper service selection to the service activation system 160. In this event, the service provider would also be responsible for notifying the service activation system 160 when service should be discontinued to the particular user. Alternatively, the DHCP server 161 in the service activation system 160 can interact with the registration server 155 using a back-end authentication protocol, e.g. the Remote Authentication Dial In User Service (RADIUS). See C. Rigney, A. Rubens, W. Simpson, S. Willens, "Remote Authentication Dial In User Service (RADIUS)," IETF Network Working Group, RFC 2058 (January 1997), which is incorporated by reference herein. The DHCP server can contain a RADIUS client and, thereby, leverage the large RADIUS embedded base used for dial access authentication. FIG. 7 illustrates this embodiment of this aspect of the invention in a flowchart corresponding to the flowchart shown in FIG. 5. At 903, the DHCP server 920 generates a random challenge and includes the challenge along with the allocated IP address in the DHCPOFFER message. The DHCP client 910 generates a response to the challenge by encrypting the challenge with a key that is derived from the subscriber's authentication information. At 904, the client 910 includes the challenge, response, and IP address in the DHCPREQUEST message. The DHCP server 920 forwards both the challenge and response in a RADIUS_ACCESS_REQ message to a RADIUS server 930 in the selected service network. The RADIUS server 930 either accepts or rejects the RADIUS request and responds accordingly at 906. If the RADIUS request is accepted, the DHCP server 920 sends a DHCPACK message at 907 and the client 910 enters a bound state. If the RADIUS request is rejected, the DHCP server 920 sends a DHCPNACK message which informs the client 910 that the IP address that was allocated has been withdrawn.

FIG. 7 is a flowchart depicting the actions of the service client in accordance with an embodiment of the invention. The subscriber is logged into a profile with a working service provider's IP address, e.g., the address allocated to the user of svc-1 (151). Within a current login session, the subscriber desires to change from the active service provider—svc-1 (151) to another subscribed service provider, svc-2 (152). In accordance with a preferred embodiment of the present invention, the subscriber makes the request using the service provider manager function of the client, which will initiate a series of steps to effect a change in the IP address for network access device 101. At step 301, the user accesses the service provider manager function of the client shown generally at 720 in FIG. 3. As discussed above, the service provider manager function enables the user to select a service provider from a stored list of service providers in the client. In the illustrative embodiment, the user is currently using active service provider svc-1 and desires to change to service provider svc-2. At step 302, the client 101 fetches the current account configuration data from the service activation system 160 over the access network and checks whether the stored list of subscribed service providers is current. Any changes can be reconciled before displaying the selection of service providers to the user. The service activation system 160 is described above and can utilize user credentials, either explicitly requested or cached automatically, to authorize the fetching of account configuration data. If the cached credentials on the client are invalid, the attempt to update the list of configured service providers may be refused and the user alerted that the credentials need to be updated. A specialized account restoration procedure can be utilized by a properlyauthorized administrative user to update the cached credentials. Alternatively, the user may ignore the message and continue using the old list of configured service providers. These options may be displayed by the client software in a manner analogous to what is commonly utilized in a dial-up connection using text-based or graphical controls. At step 303, the user selects an option within the service provider manager function to switch to the new service provider (svc-2). If the second service provider is not configured, then the service provider manager function 720 of the client can offer to add the new service provider. The client can be configured to automatically connect to the service activation system 160 and enable the user to interact with a service provider management feature in the service activation system 160 as well as any necessary service provider-specific registration sites. After receiving the proper configuration data and any service provider access credentials, if required by the service provider, the client can return back to step 303 in FIG. 7. At step 304, the client displays a warning with respect to switching between service providers while network applications are running. The user can then choose to either continue or cancel the operation. If the user chooses to cancel, then, at step 305, the current service provider association remains in effect and the client service provider manager function ends.

If the user chooses to continue, the client signals the service activation system 160 at step 306 for a service provider change and provides the access device's (111) physical address information, such as a MAC address as discussed above. The client will also send the subscriber's credentials, in one exemplary embodiment, to enable the service activation system to authenticate the subscriber. The service activation system (registration server 162) will check the subscriber's credentials and credit information utilizing a network-based subscription/authorization process for the various services shared on the access network infrastructure. As described above, each user of the client 101 must be authenticated for a particular service since all subscribers of the client are using a common broadband connection. At step 307, the client receives confirmation from the service activation system 160 that the change to the new service provider is authorized. If the authorization fails, the service activation system 160 returns an error message to the client, the existing service provider association remains in effect, and the client service provider manager function ends. If authorization to switch to the new service provider has succeeded, at step 308, the client sends a message to a local DHCP process (controlled by network application software in the client or on a networked system) requesting that it release and renew the IP address of the access device 101 in accordance with the methodology described above and illustrated in FIG. 5. In this manner, a new IP address is assigned to the access device from the selected service provider. At step 309, the client can update the browser interface 790 to reflect the settings specific to the active service provider (e.g., svc-2).

The present disclosure has been shown in what are considered to be the most preferred and practical embodiments. It is anticipated, however, that departures may be made therefrom and that obvious modifications may be implemented by persons skilled in the art.

We claim:

1. A method for configuring a network access device including a first network address allocated to a subscriber by a first service provider operating a first service network, and a second network address allocated to the subscriber by a second service provider operating a second service network, wherein the network access device is connected to an access network providing access to at least the first and second service networks, comprising:

sending to the subscriber, an updated list of service providers, stored at the network access device in response to successful authenticating of subscriber credentials;

receiving from the subscriber, a request to access the second service provider from the list of service providers;

sending, from the network access device to the access network, a request to access the second service provider; and initiating a network address change request using a configuration protocol, wherein the first network address is released and the second network address is used by the network access device to communicate data packets to the second service provider over the access network.

2. The method of claim 1, wherein the request to the access network includes an authentication request for the subscriber.

3. The method of claim 1, further comprising:

receiving a response from the access network including an authentication status for the subscriber from the second service provider; and initiating the network address change upon successful authentication.

4. The method of claim 1, wherein the configuration protocol is a dynamic configuration protocol.

5. The method of claim 1, wherein the network access device receives an internet protocol address.

6. The method of claim 1, further comprising:

receiving a response from the access network including an authentication status for the subscriber from the second service provider; and informing the network access device that the request has been withdrawn if the authentication is rejected.

7. A method for configuring a network access device including a first network address allocated to a subscriber by a first service provider operating a first service network, and a second network address allocated to the subscriber by a second service provider operating a second service network, wherein the network access device is connected to an access network providing access to at least the first and second service networks, comprising:

sending a request from the network access device to the access network including cached credentials requesting access to the second service provider;

alerting a subscriber to update the cached credentials if the cached credentials are invalid;

providing to the subscriber, an updated list of service providers, stored at the network access device in response to successful authentication of the updated credentials;

selecting the second service provider from the list of service providers; and sending, from the network access device to the access network, a request to access the second service provider including the credentials.

8. The method of claim 7, further comprising:

initiating a network address change request using a configuration protocol.

9. The method of claim 8, wherein the first network address is released and the second network address is allocated to the subscriber to the network access device.

10. The method of claim 7, wherein the subscriber is provided with an older list of service providers, in response to unsuccessful authentication of updated credentials.

11. The method of claim 7, wherein the request to the access network includes an authentication request for the subscriber.

12. The method of claim 8, wherein the configuration protocol is a dynamic configuration protocol.

\* \* \* \* \*